3,484,370
METHOD OF SEPARATING OIL AND WATER
Ralph Simon, Whittier, Calif., assignor to Chevron Research Company, San Francisco, Calif., a corporation of Delaware
No Drawing. Filed Sept. 27, 1967, Ser. No. 671,144
Int. Cl. B01d 29/08, 29/00
U.S. Cl. 210—23                                   7 Claims

ABSTRACT OF THE DISCLOSURE

A method for improving the coalescing of dispersed phase droplets contained in a continuous phase system which is forced through coalescing media by pretreating the system with a surfactant having a preselected HLB number to assist in preferentially wetting the coalescing element by the dispersed phase droplets resulting in improved coalescing of the droplets.

---

This invention relates to a method of improving coalescing of small droplets of a dispersed phase in a continuous phase system which is flowed through coalescing media by treating the system prior to such flow with a surfactant. More particularly, this invention is directed to improving the coalescing of dispersed oil in a water system or dispersed water in an oil system by adding a preselected surfactant to such systems prior to flow through coalescing media. In a still more particular aspect, this invention relates to improving the coalescing of oil dispersed in a waste water system which is to be flowed through coalescing media by adding to the system a selected non-ionic surfactant.

It has been known heretofore that a dispersed phase in a continuous phase system can be coalesced by flowing the system through coalescing media. For example, it has been heretofore known that water streams containing minute amounts of oil in the form of tiny oil droplets can be coalesced by flowing the waste water containing the oil droplets through coalescing media. The droplets are coalesced as they are brought into intimate contact by the coalescing media. It is believed that the coalescing media works by slowing the tiny droplets so that they contact each other and by reducing the surface tension of the droplets so that there is a great tendency for droplets to collect on the downstream portion of the coalescing media and coalesce. When the droplets have reached sufficient size, they flow through the coalescing medium and are easily removed from the water by gravity separation because of density difference. A particular problem, however, has arisen when the droplets have been extremely finely divided in the system. It has been found that when this occurs, coalescing by use of coalescing media alone becomes somewhat ineffective.

In a broad aspect, the present invention comprises a method of improving the efficiency of a coalescing device by adding a selected surfactant to the liquid system containing the dispersed phase prior to flowing the system through the coalescing device. The preselected surfactant tends to assist in providing a film of the dispersed phase on the surface of the coalescing media in the coalescing device and thus assists in improving the efficiency of the media. In a more specific aspect, the present invention comprises a method of improving the efficiency of a coalescing device by adding a hydrophobic surfactant to a water system containing a dispersed phase prior to flowing said system through a coalescing device. In a more particular sense, a nonionic surfactant is added to water containing dispersed oil droplets. The nonionic surfactant should have an HLB number of less than 7. Preferably, the HLB number should be more than 2. The preferred range of HLB number is from 3 to 7. In surfactants with ethylene oxide groups, the surfactant should have three or less ethylene oxide groups and is preferably added to the water in an amount within the range of from 50 to 200 p.p.m. A surfactant from the group having a general formula of $RO-(CH_2CH_2O)_n-H$, where R has from 6 to 20 carbon atoms and where $n$ is less than 4, is preferred for use in accordance with this aspect of the invention. In a system where water is the dispersed phase, different surfactants must be selected. Thus, both nonionic and anionic surfactants are useful. A nonionic surfactant having an HLB number of 10 or more is preferred. In surfactants containing ethylene oxide groups, the number of such groups should be 7 or more.

An object of the present invention is to assist a coalescing element in coalescing a dispersed phase in a continuous phase system by causing the dispersed phase to more readily wet a coalescing device through which the system is passed. A more specific object of the invention is to assist a coalescing element in coalescing oil droplets by rendering the coalescing element preferably oil-wettable by the addition of a small amount of a nonionic surfactant to the water in which the oil is to be coalesced. Further objects and advantages of this invention will become apparent from the following detailed description.

In accordance with a broad aspect, the present invention relates to improving the coalescing of a dispersed phase in a continuous phase system which is passed through a coalescing device by adding to the system a substance which will tend to promote wetting of the coalescing element with the dispersed phase. The invention is particularly useful with oil-and-water systems. Thus, given a particular system from which it is desired to separate a dispersed phase, a surfactant is selected which will promote wetting of the coalescing device by the dispersed phase. This selected surfactant is added to the system and the system is then flowed through a coalescing device to cause coalescing of the dispersed phase, which results in separation of the phases because of density differences.

In accordance with one aspect of the invention, a water system containing oil droplets suspended therein is directed through a coalescing element. The coalescing element is formed of coalescing media. A preferred form of media for use in fabricating a coalescing element in accordance with the present invention is media formed from synthetic fibres. An especially useful media for use in the invention is formed from a batt of fibres selected from the class consisting of polyester fibres, acrylic fibres, modacrylic fibres, and mixtures of such fibres. The batt is preferably bonded with about 20% to 100% by weight of the fibres of a polymer resin selected from the class consisting of polyacrylic resins, polyurethane resins and synthetic rubbers. The waste water stream containing the oil droplets is passed through a coalescing element formed from the batt of fibres and the batt causes the oil droplets to adhere thereto and to intimately contact other droplets causing coalescing of the droplets into drops of sufficient size for gravity separation from the water.

It has been found that coalescing of oil in oil-water systems where the oil is very finely divided in the water can be markedly enhanced by the addition of a selected surfactant to the oil-water system. The predominant factors which tend to make coalescing, and thus separation, of oil droplets from a water system difficult appear to be the initial energy which is used to mix the droplets into the water and also certain chemical forces which may be exerted by additives within the water system. In situations where a great deal of energy has been put into the water system, tending to make the oil particles quite small, or where the surface tension of the droplets is high, it is desirable to add a nonionic surfactant to the oil-water system and then to flow the system through a coalescing element to promote coalescing of the oil droplets so that the oil and water can be separated more readily.

It is preferred that the nonionic surfactant be added to the system at a uniform rate at a point upstream from the coalescing element so that the surfactant will have had time to become dispersed uniformly throughout the oil-water system prior to the time the oil and water is flowed into the coalescing element. The surfactant is one of a class which will make the coalescing media preferentially oil set to thus assist in retaining the small droplets of oil on the media, thereby increasing the chance of causing them to coalesce into larger size droplets. The surfactant should be relatively highly soluble in oil and relatively less soluble in water. The surfactant should have a low HLB number. The HLB number refers to the hydrophile-lipophile balance number. The size of the number indicates the relative solubility of the surfactant in oil versus the relative solubility of the surfactant in water. A number in the range of from 7–10 indicates a surfactant which is about equally soluble in both oil and water, depending on a number of factors, including temperature. A high HLB number such as, for example, 18–20, indicates a surfactant which is very soluble in water and not very soluble in oil. Conversely, a low HLB number, i.e., less than 5, indicates a surfactant which is quite soluble in oil and relatively less soluble in water. Surfactants having a low HLB number tend to promote the formation of water-in-oil emulsions and to oil-wet surfaces with which they come in contact. This type of surfactant is useful in the present invention to promote contact of the coalescing media by oil droplets and the subsequent formation of larger droplets.

A non-ionic surfactant particularly useful in this aspect of the invention perferably has the general formula RO—$(CH_2CH_2O)_n$—H, where R has from 6 to 20 carbon atoms and $n$ is a number less than 4. In a particularly preferred form, R has between 10 and 14 carbon atoms and $n$ is equal to between 1 and 3. The surfactant should have a low HLB number. The HLB number should be less than 7 and preferably 3 to 7. The surfactant is added to the oil-water system in an amount in the range of 10 to 10,000 p.p.m. based on the oil-water system. It is desirable to add from about 50 to 150 p.p.m. to the waste water system. Best results are obtained when about 100 p.p.m. of the surfactant is mixed with the oil-water system.

In accordance with another aspect of the invention wherein a discontinuous water phase is contained in a continuous oil phase, a selected surfactant is added to the oil and water to cause the water to preferentially wet the coalescing element. A coalescing element, useful to coalesce water, is formed of a coalescing media to which water adheres, causing the water droplets to contact each other and thereby coalesce. A surfactant having a relatively high HLB number is suitable for use in accordance with this aspect of the invention. The HLB number should be greater than 10. Many non-ionic surfactants and anionic surfactants are useful in assisting a coalescing element coalesce water. Cationic surfactants, in some instances, depending on the nature of the cation, may also be useful in this aspect of the invention. A preferred surfactant in accordance with this form of the invention is one having the general formula RO—$CH_2CH_2O)_n$—H, where R is 8 or more carbon atoms and where $n$ is 7 or larger. The preferred number of carbon atoms is from 9 to 18.

The HLB number of the surfactant should be 10 or more. In accordance with the invention, the surfactant is added to the oil-water system prior to flowing the oil-water system to a coalescing element. The surfactant is added to the oil-water system in an amount between 10 and 10,000 p.p.m. and preferably in an amount between 50 and 150 p.p.m. It is highly preferred to add about 100 p.p.m. of surfactant to the oil-water system.

I claim:
1. A method of improving the efficiency of a coalescing element in coalescing oil droplets to assist in the separation of oil from water comprising the steps of adding to an oil-water system prior to flowing said system to a coalescing element a surfactant which will assist in preferentially oil-wetting the coalescing element, flowing said system through said coalescing element and coalescing said droplets.

2. A method of improving the efficiency of a coalescing element in use to coalesce dispersed water droplets in a continuous oil phase comprising the steps of adding to an oil-water system prior to flowing said system through a coalescing element a surfactant which will cause the coalescing element to be preferentially water-wet, said surfactant having an HLB number of greater than 10, flowing said oil-water system through said coalescing element and coalescing said water droplets to assist in the separation of said oil and said water.

3. A method of improving the efficiency of a coalescing element in use to coalesce oil droplets contained in the oil oil-water system comprising the steps of adding to the oil-water system a non-ionic surfactant having the general formula RO—$(CH_2CH_2O)_n$—H, where R has from 6 to 20 carbon atoms and $n$ is a number less than 4, said surfactant having an HLB number of less than 7, flowing said oil-water system through a coalescing element and coalescing said oil droplets.

4. The method of claim 3 further characterized in that the surfactant is added to the oil-water system in an amount between 10 and 10,000 p.p.m.

5. The method of claim 3 further characterized in that the surfactant is added to the oil-water system in an amount from 50 to 150 p.p.m.

6. The method of claim 3 further characterized in that about 100 p.p.m. of surfactant is added to the oil-water system.

7. A method of improving the efficiency of a coalescing element in separating a two-phase oil and water system, said system comprising a discontinuous liquid phase of oil or water and a continuous phase of the other of such liquids, comprising the steps of adding to a two-phased oil and water system prior to flowing said system to a coalescing element, a surfactant which will assist the discontinuous phase in preferentially wetting the coalescing element, flowing said system through said coalescing element and coalescing the discontinuous phase.

References Cited

UNITED STATES PATENTS

| 2,965,678 | 12/1960 | Sundberg et al. | 252—351 X |
| 3,247,104 | 4/1966 | Sako et al. | 210—23 X |
| 3,256,997 | 6/1966 | Pall et al. | 210—23 X |

JAMES L. DECESARE, Primary Examiner

U.S. Cl. X.R.

210—59